(12) United States Patent
Guo et al.

(10) Patent No.: US 8,874,522 B2
(45) Date of Patent: Oct. 28, 2014

(54) MANAGING BACKUPS OF DATA OBJECTS IN CONTAINERS

(75) Inventors: Fanglu Guo, Los Angeles, CA (US); Petros Efstathopoulos, Los Angeles, CA (US); Xianbo Zhang, Madison, WI (US); Sanjay Sawhney, Cupertino, CA (US); Weibao Wu, Vadnais Heights, MN (US)

(73) Assignee: Symantec Corporation, Mountain View, CA (US)

( * ) Notice: Subject to any disclaimer, the term of this patent is extended or adjusted under 35 U.S.C. 154(b) by 91 days.

(21) Appl. No.: 13/285,331

(22) Filed: Oct. 31, 2011

(65) Prior Publication Data

US 2013/0110784 A1    May 2, 2013

(51) Int. Cl.
  *G06F 17/30* (2006.01)
  *G06F 7/00* (2006.01)
  *G06F 11/14* (2006.01)

(52) U.S. Cl.
  CPC ........ *G06F 11/1448* (2013.01); *G06F 11/1451* (2013.01); *G06F 2201/81* (2013.01); *G06F 11/1469* (2013.01)
  USPC ........................................................ 707/649

(58) Field of Classification Search
  USPC .......................................................... 707/649
  See application file for complete search history.

(56) References Cited

U.S. PATENT DOCUMENTS

| | | | |
|---|---|---|---|
| 7,552,358 B1 * | 6/2009 | Asgar-Deen et al. | 714/6.1 |
| 2011/0016091 A1 * | 1/2011 | Prahlad et al. | 707/654 |
| 2011/0029739 A1 * | 2/2011 | Nakajima et al. | 711/154 |
| 2011/0252071 A1 * | 10/2011 | Cidon | 707/802 |
| 2012/0016839 A1 * | 1/2012 | Yueh | 707/624 |

OTHER PUBLICATIONS

IBM System Storage Solutions for Smarter Systems, Jul. 2011, IBM.*

* cited by examiner

*Primary Examiner* — Kuen Lu
(74) *Attorney, Agent, or Firm* — Wilmer Cutler Pickering Hale and Dorr LLP

(57) ABSTRACT

Containers that store data objects that were written to those containers during a particular backup are accessed. Then, a subset of the containers is identified; the containers in the subset have less than a threshold number of data objects associated with the particular backup. Data objects that are in containers in that subset and that are associated with the backup are copied to one or more other containers. Those other containers are subsequently used to restore data objects associated with the backup.

17 Claims, 10 Drawing Sheets

MANAGING BACKUPS OF DATA OBJECTS IN CONTAINERS

BACKGROUND

By making a backup copy of an active database at a point in time, the state of the database at that point in time can be restored if, for example, the database subsequently becomes corrupted or is lost. Deduplication of data can reduce the amount of storage space and bandwidth consumed by backups and restores. With deduplication, after a "chunk" of data is stored, other instances of data that match that chunk are replaced with a reference to the stored chunk of data.

While deduplication can improve performance in some ways, it can reduce the efficiency of restore operations, especially as the number of backups increases. For example, as a result of a first backup, data is copied and stored in a first set of disk locations. After a second backup is performed, data that is duplicated in the second backup will be replaced with a reference to the matching data in the first backup. Thus, some of the data associated with the second backup is stored in a second set of disk locations, while the rest of the data associated with the second backup is stored in the first set of disk locations. In a similar manner, data associated with a third backup may be stored in three sets of disk locations. As the number of backups increases, the data associated with the later backups becomes more and more fragmented.

As a result, data throughput during a restore decreases as the number of backups increases. For the same set of files, the restore throughput of the first, 10th, 20th, and 30th backups can be 500, 300, 213, and 156 megabytes/second (MB/sec), respectively, for example.

Restores may be performed routinely for a variety of reasons such as for compliance reasons. Consequently, a technique for improving restore throughput while maintaining the benefits of deduplication would be advantageous.

SUMMARY

According to embodiments of the present disclosure, restore performance is improved, especially for situations in which multiple backups are performed in combination with deduplication.

Generally speaking, according to embodiments of the present disclosure, an analysis is made to determine if a particular backup references too few data objects in a "container." (As used herein, a container refers to the collection of disk locations used to store the data objects for a particular backup.) If the container does not store too few data objects for the backup of interest, then the container is not acted on. If the container stores too few data objects for the backup of interest, then the data objects in the container that are referenced by that backup are copied to a new (second) container. In one embodiment, the remainder of the data objects in the original container are optionally copied to a new (third) container. Other containers associated with the particular backup are similarly treated. As a result, the data objects associated with a particular backup are merged into the same container or set of containers, so that they can be more readily accessed during a restore operation. The metadata for the moved objects is updated to reflect the new locations, and the original container may be reclaimed for use in a subsequent backup.

Thus, in one embodiment, containers that store data objects that were written to those containers during a particular backup are accessed. Then, a subset of the containers is identified, such that the containers in the subset have (store) less than a threshold number of data objects associated with that backup. Data objects that are associated with the backup are copied to one or more other containers. Those other containers are subsequently used to more efficiently restore data objects.

For ease of discussion, the process just described may be referred to herein as a "pseudo full backup." This process can be triggered based on the threshold mentioned above, or it can be triggered when restore performance becomes too slow. Restore performance can also be improved using a process referred to herein as "doubly sorted queuing" for ease of discussion. With doubly sorted queuing, during a restore, read requests are sorted into a first queue according to the disk positions of the data objects/blocks to be read in order to improve disk read access patterns. Read results are then accumulated in a second queue and sorted again according to the original disk write order in order to improve disk write access patterns.

In one embodiment, data objects to be included in a restore are identified. An order for reading the data objects is determined, where the read order is based on the on-disk positions of the data objects to be read during the restore. An order for writing the data objects is also determined, where the write order is based on the on-disk positions to which the data objects are to be written during the restore. In one such embodiment, a list of data objects to be read is compiled, and the list is sorted into a first queue according to the positions on memory disks from which the of data objects are to be read. Also, the list is sorted into a second queue according to the positions on memory disks to which the data objects are to be written. During a restore, the objects are read according to the first queue, and written according to the second queue.

In summary, embodiments according to the present disclosure improve restore throughput and overall performance by introducing pseudo full backups and doubly sorted queuing.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
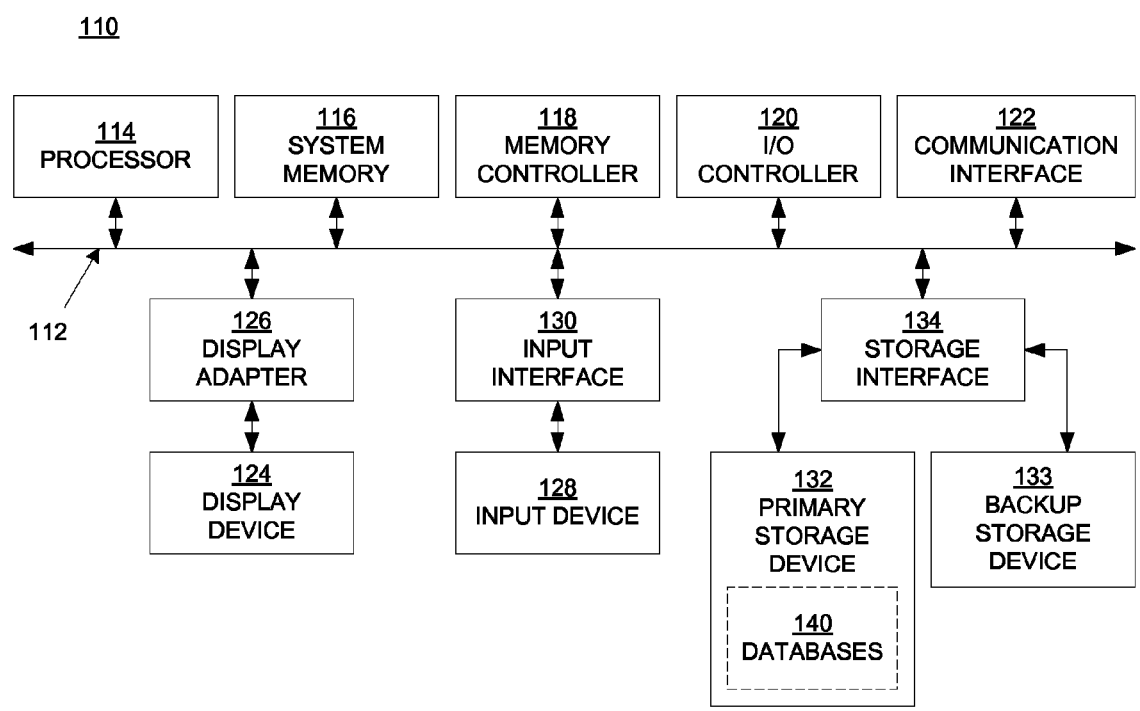
FIG. 1 is a block diagram of an example of a computing system capable of implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "restoring," "backing up," "writing," "reading," "storing," "identifying," "copying," "referencing," "determining," "updating," "compiling," "sorting," "deduplicating," or the like, refer to actions and processes (e.g., flowcharts 600, 800, and 1000 of FIGS. 6, 8, and 10, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. The computing system 110 broadly represents any single or multi-processor computing device or system capable of executing computer-readable instructions. Examples of the computing system 110 include, without limitation, workstations, laptops, client-side terminals, servers, distributed computing systems, handheld devices, or any other computing system or device. In its most basic configuration, the computing system 110 may include at least one processor 114 and a system memory 116.

The processor 114 generally represents any type or form of processing unit capable of processing data or interpreting and executing instructions. In certain embodiments, the processor 114 may receive instructions from a software application or module. These instructions may cause the processor 114 to perform the functions of one or more of the example embodiments described and/or illustrated herein. For example, the processor 114 may perform and/or be a means for performing, either alone or in combination with other elements, one or more of the identifying, determining, using, implementing, translating, tracking, receiving, moving, and providing described herein. The processor 114 may also perform and/or be a means for performing any other steps, methods, or processes described and/or illustrated herein.

The system memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments the computing system 110 may include both a volatile memory unit (such as, for example, system memory 116) and a non-volatile storage device (such as, for example, the primary storage device 132).

The computing system 110 may also include one or more components or elements in addition to the processor 114 and the system memory 116. For example, in the embodiment of FIG. 1, the computing system 110 includes a memory controller 118, an input/output (I/O) controller 120, and a communication interface 122, each of which may be interconnected via a communication infrastructure 112. The communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

The memory controller 118 generally represents any type or form of device capable of handling memory or data or controlling communication between one or more components of the computing system 110. For example, the memory controller 118 may control communication between the processor 114, system memory 116, and the I/O controller 120 via the communication infrastructure 112. Memory controller may perform and/or be a means for performing, either alone or in combination with other elements, one or more of the operations or features described herein.

The I/O controller 120 generally represents any type or form of module capable of coordinating and/or controlling the input and output functions of a computing device. For example, the I/O controller 120 may control or facilitate transfer of data between one or more elements of the computing system 110, such as the processor 114, system memory 116, the communication interface 122, the display adapter 126, the input interface 130, and the storage interface 134. The I/O controller 120 may be used, for example, to perform and/or be a means for performing, either alone or in combination with other elements, one or more of the operations described herein. The I/O controller 120 may also be used to perform and/or be a means for performing other operations and features set forth in the instant disclosure.

The communication interface 122 broadly represents any type or form of communication device or adapter capable of facilitating communication between the example computing system 110 and one or more additional devices. For example, the communication interface 122 may facilitate communication between the computing system 110 and a private or public network including additional computing systems. Examples of the communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through, for example, a local area network (such as an Ethernet network), a personal area network, a telephone or cable network, a cellular telephone connection, a satellite data connection, or any other suitable connection.

The communication interface 122 may also represent a host adapter configured to facilitate communication between the computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. The communication interface 122 may also allow the computing system 110 to engage in distributed or remote computing. For example, the communication interface 122 may receive instructions from a remote device or send instructions to a remote device for execution. The communication interface 122 may perform and/or be a means for performing, either alone or in combination with other elements, one or more of the operations disclosed herein. The communication interface 122 may also be used to perform and/or be a means for performing other operations and features set forth in the instant disclosure.

As illustrated in FIG. 1, the computing system 110 may also include at least one display device 124 coupled to the communication infrastructure 112 via a display adapter 126. The optional display device 124 generally represents any type or form of device capable of visually displaying information forwarded by the display adapter 126. Similarly, the display adapter 126 generally represents any type or form of device configured to forward graphics, text, and other data from the communication infrastructure 112 (or from a frame buffer, as known in the art) for display on the display device 124.

As illustrated in FIG. 1, the computing system 110 may also include at least one input device 128 coupled to the communication infrastructure 112 via an input interface 130. The input device 128 generally represents any type or form of input device capable of providing input, either computer-generated or human-generated, to the computing system 110. Examples of the input device 128 include, without limitation, a keyboard, a pointing device, a speech recognition device, or any other input device. In one embodiment, the input device 128 may perform and/or be a means for performing, either alone or in combination with other elements, one or more of the operations disclosed herein. The input device 128 may also be used to perform and/or be a means for performing other operations and features set forth in the instant disclosure.

As illustrated in FIG. 1, the computing system 110 may also include a primary storage device 132 and a backup storage device 133 coupled to the communication infrastructure 112 via a storage interface 134. The storage devices 132 and 133 generally represent any type or form of storage device or medium capable of storing data and/or other computer-readable instructions. For example, the storage devices 132 and 133 may be a magnetic disk drive (e.g., a so-called hard drive), a floppy disk drive, a magnetic tape drive, an optical disk drive, a flash drive, or the like. The storage devices may be arranged into logical, redundant storage containers or RAID (redundant array of independent disks) arrays. The storage interface 134 generally represents any type or form of interface or device for transferring data between the storage devices 132 and 133 and other components of the computing system 110.

In one example, the databases 140 may be stored in the primary storage device 132. The databases 140 may represent portions of a single database or computing device or a plurality of databases or computing devices. For example, the databases 140 may represent (be stored on) a portion of computing system 110 and/or portions of the example network architecture 200 in FIG. 2 (below). Alternatively, the databases 140 may represent (be stored on) one or more physically separate devices capable of being accessed by a computing device, such as the computing system 110 and/or portions of the network architecture 200. In one embodiment, the databases 140 are Structured Query Language (SQL) databases.

Continuing with reference to FIG. 1, the storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 132 and 133 may also include other similar structures or devices for allowing computer software, data, or other computer-readable instructions to be loaded into the computing system 110. For example, the storage devices 132 and 133 may be configured to read and write software, data, or other computer-readable information. The storage devices 132 and 133 may also be a part of the computing system 110 or may be separate devices accessed through other interface systems.

The storage devices 132 and 133 may be used to perform, and/or be a means for performing, either alone or in combination with other elements, one or more of the operations disclosed herein. The storage devices 132 and 133 may also be used to perform, and/or be a means for performing, other operations and features set forth in the instant disclosure.

Many other devices or subsystems may be connected to the computing system 110. Conversely, all of the components and devices illustrated in FIG. 1 need not be present to practice the embodiments described herein. The devices and subsystems referenced above may also be interconnected in different ways from that shown in FIG. 1. The computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of the storage devices 132 and 133. When executed by the processor 114, a computer program loaded into the computing system 110 may cause the processor 114 to perform and/or be a means for performing the functions of the example embodiments described and/or illustrated herein. Additionally or alternatively, the example embodiments described and/or illustrated herein may be implemented in firmware and/or hardware. For example, the computing system 110 may be configured as an application specific integrated circuit (ASIC) adapted to implement one or more of the embodiments disclosed herein.

Figure 2:
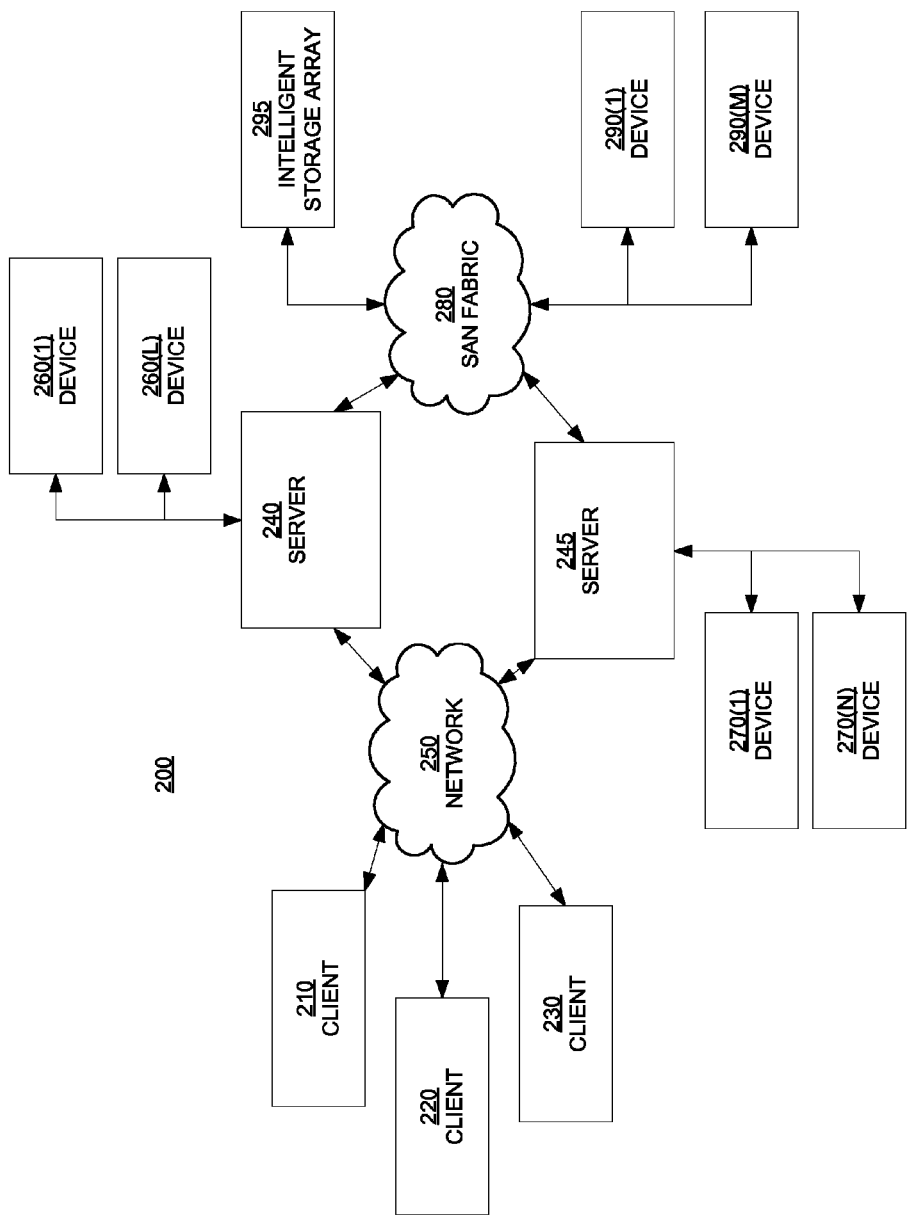
FIG. 2 is a block diagram of an example of a network architecture capable of implementing embodiments according to the present disclosure.

FIG. 2 is a block diagram of an example of a network architecture 200 in which client systems 210, 220, and 230 and servers 240 and 245 may be coupled to a network 250. The client systems 210, 220, and 230 generally represent any type or form of computing device or system, such as the computing system 110 of FIG. 1.

Similarly, the servers 240 and 245 generally represent computing devices or systems, such as application servers or database servers, configured to provide various database services and/or run certain software applications. The network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to the server 240. Similarly, one or more storage devices 270(1)-(N) may be directly attached to the server 245. The storage devices 260(1)-(L) and storage devices 270(1)-(N) generally represent any type or form of storage device or medium capable of storing data and/or other computer-readable instructions. The storage devices 260(1)-(L) and storage devices 270(1)-(N) may represent network-attached storage (NAS) devices configured to communicate with the servers 240 and 245 using various protocols, such as Network File System (NFS), Server Message Block (SMB), or Common Internet File System (CIFS).

The servers 240 and 245 may also be connected to a storage area network (SAN) fabric 280. The SAN fabric 280 generally represents any type or form of computer network or architecture capable of facilitating communication between storage devices. The SAN fabric 280 may facilitate communication between the servers 240 and 245 and the storage devices 290(1)-(M) and/or an intelligent storage array 295. The SAN fabric 280 may also facilitate, via the network 250 and the servers 240 and 245, communication between the client systems 210, 220, and 230 and the storage devices 290(1)-(M) and/or intelligent storage array 295 in such a manner that the devices 290(1)-(M) and the array 295 appear as locally attached devices to the client systems 210, 220, and 230. As with the storage devices 260(1)-(L) and the storage devices 270(1)-(N), the storage devices 290(1)-(M) and the intelligent storage array 295 generally represent any type or form of storage device or medium capable of storing data and/or other computer-readable instructions.

With reference to the computing system 110 of FIG. 1, a communication interface, such as communication interface 122, may be used to provide connectivity between each client system 210, 220, and 230 and the network 250. The client systems 210, 220, and 230 may be able to access information on the server 240 or 245 using, for example, a Web browser or other client software. Such software may allow the client systems 210, 220, and 230 to access data hosted by the server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by the server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in the server 240, run by the server 245, and distributed to the client systems 210, 220, and 230 over the network 250. Accordingly, the network architecture 200 may perform and/or be a means for performing, either alone or in combination with other elements, one or more of the operations disclosed herein. The network architecture 200 may also be used to perform and/or be a means for performing other operations and features set forth in the instant disclosure.

Managing Backups of Data Objects in Containers

Figure 3:
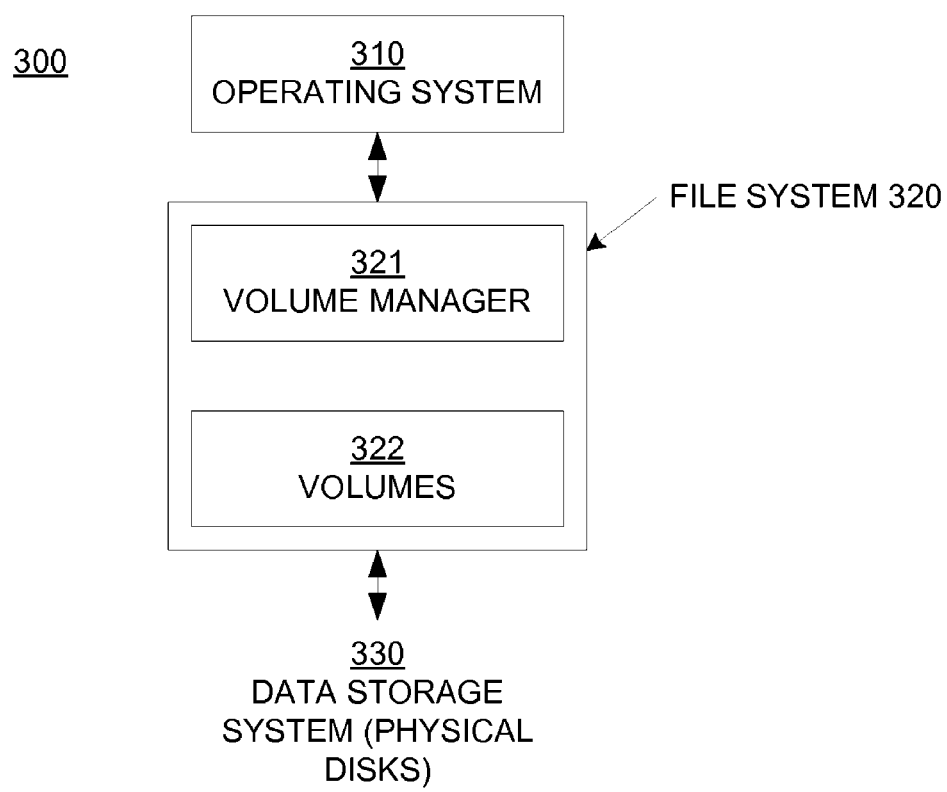
FIG. 3 represents an example of a file management system upon which embodiments according to the present disclosure can be implemented.

With reference to FIG. 3, a file management system 300 includes an operating system 310 and a file system 320 coupled to a physical data storage system 330. The file system 320 includes a volume manager 321 that operates as a subsystem between the operating system 310 and one or more volumes 322 of data (blocks of data) that are stored in the data storage system 330. The data storage system 330 may include physical storage devices such as an array of physical disks, LUNs (SCSI logical units), or other types of hardware that are used to store data. The volume manager 321 overcomes restrictions associated with the physical storage devices by providing a logical volume management layer that allows data to be spread across multiple physical disks within a disk array (not shown) in a manner that is transparent to the operating system 310. Each of the volumes 322 can retrieve data from one or more of the physical storage devices, and the volumes 322 are accessed by file systems, databases, and other applications in the same way that physical storage devices are accessed. The file system 310 can be any database application for managing databases, such as but not limited to ORACLE DATABASE, a SQL (Structured Query Language) server, or MICROSOFT ACCESS.

Embodiments according to the present invention pertain to backing up and restoring data objects (e.g., databases 140 of FIG. 1) managed by the file system 310. These operations can be performed using an application for creating snapshots and backup copies of the data objects, such as MICROSOFT's Volume Snapshot Service (VSS).

Figure 4:
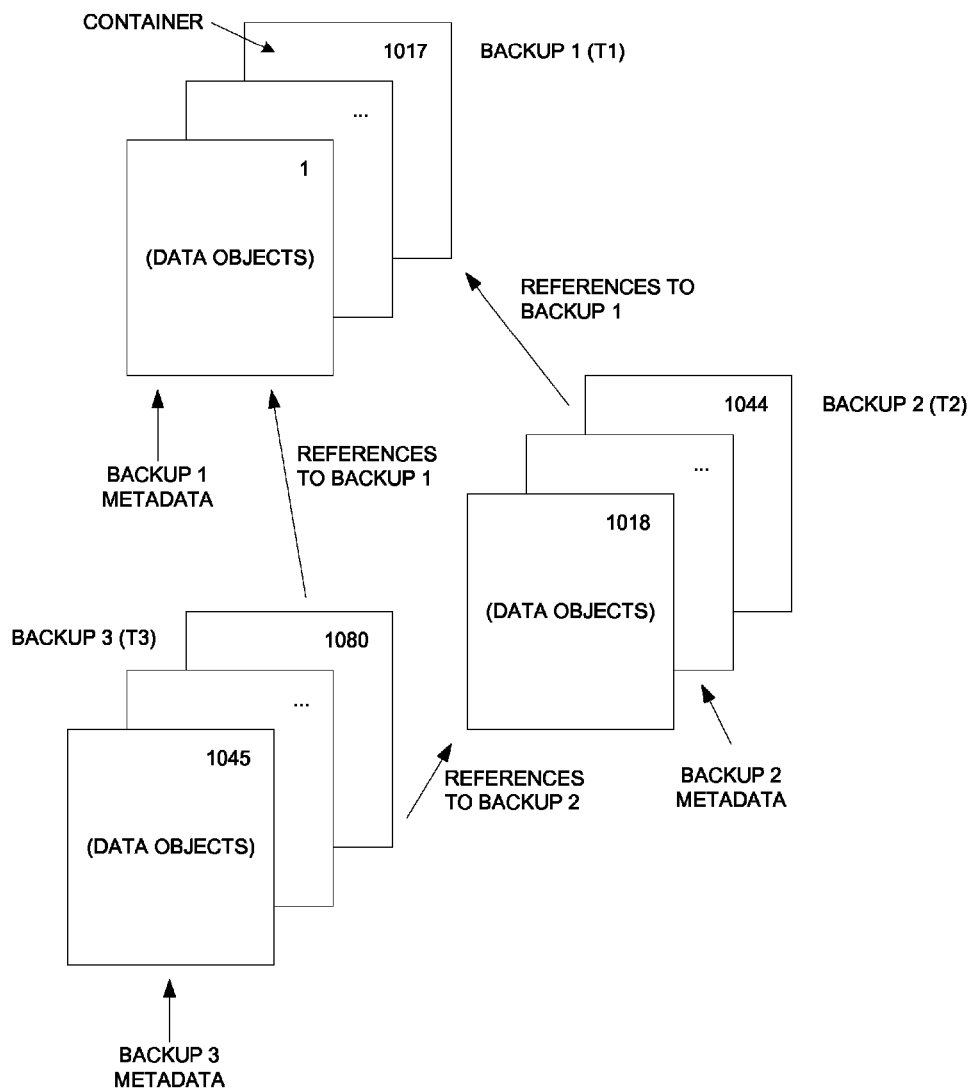
FIG. 4 is a block diagram representing an example of a backup operation according to embodiments of the present disclosure.

FIG. 4 is a block diagram representing an example of a backup operation according to embodiments of the present disclosure. At some point in time T1, a first backup (backup 1) is performed. In backup 1, data objects are stored in the set of containers with container identifiers (IDs) 1, . . . , 1017. As used herein, a container refers to the set or collection of disk locations used to store the data objects for a particular backup. The disk locations may or may not be contiguous with one another. Each backup is associated with its own set of containers; that is, data objects associated with one backup are not stored in (mixed into) the containers associated with another backup. However, this does not mean that one backup cannot reference a data object that is in a container for another backup. That is, because of deduplication, data stored in a container for one backup may be replaced with a reference to matching data in another container.

Also, the container IDs used in these examples are arbitrarily chosen for illustration purposes only; that is, the manner in which the containers are identified is immaterial to this disclosure. Also, the number of containers associated with each backup may be different than described in this example; that is, the number of containers associated with a particular backup depends on, for example, the amount of data stored in the backup, and can vary from one backup to another. In general, containers have a fixed size (containers are all the same size), although this does not have to be the case.

As just noted, data objects for backup 1 are stored in containers 1-1017, and therefore metadata that is used to track the data objects for backup 1 points to containers 1-1017. At time T2 (after time T1), data objects for backup 2 are stored in containers 1018-1044, and metadata for backup 2 points to those containers. Furthermore, in this example, some of the data objects for backup 2 match those in containers 1-1017, and therefore those data objects are replaced with references to the matching data objects (deduplication). Similarly, at time T3 (after time T2), data objects for backup 3 are stored in containers 1045-1080, and metadata for backup 3 points to those containers. Also, in this example, some of the data objects for backup 3 match those in containers 1-1044, and therefore those data objects are replaced with references to the matching data objects (deduplication).

As more and more backups are performed, the containers for the more recent backups may consist of references to an increasing number of older containers (the containers associated with earlier backups). If the backed up data is relatively dynamic, then the number of data objects referenced in the containers associated with the oldest containers (the containers associated with the earliest backups) may be relatively small.

Figure 5:
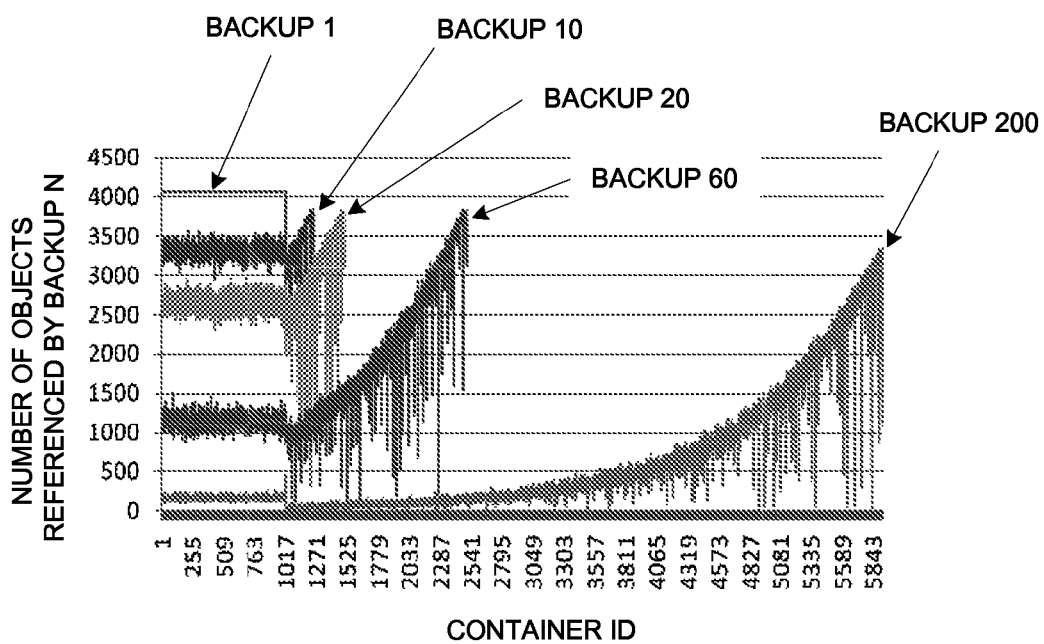
FIG. 5 is a graph illustrating an example of a relationship between data objects referenced by a backup and containers that store backup data.

This point is illustrated in the graph of FIG. 5. In the example of FIG. 5, approximately 1017 containers are used for the first backup, with approximately 4000 data objects per container. In the 20th backup, approximately 1525 containers are used. The 20th backup includes new containers, and also includes references to data objects in containers for previously performed backups; for example, in containers 1-1017, approximately 2500-2800 data objects per container are referenced by the 20th backup. In the 200th backup, 5483 containers are used and referenced. As can be seen from the example of FIG. 5, many of the containers associated with the 200th backup contain a relatively small number of data objects referenced by the 200th backup. For example, in containers 1-3557, less than 500 data objects per container are referenced by the 200th backup. In general, if the data changes over time, then the latest backups (e.g., backup 200) will reference data in more and more containers, with fewer objects referenced in the older containers. Thus, a conventional restore after the 200th backup would require processing of a large number of containers, with many of those containers providing relatively little useful data, reducing restore throughput as previously described herein.

Another full backup, like backup 1, can return restore throughput to an acceptable level. However, a full backup can consume a significant portion of computational and network resources. Embodiments according to the present invention solve these problems by separating newer and/or recently used data from older and/or unused data using a "pseudo full backup" as described in FIG. 6.

Figure 6:
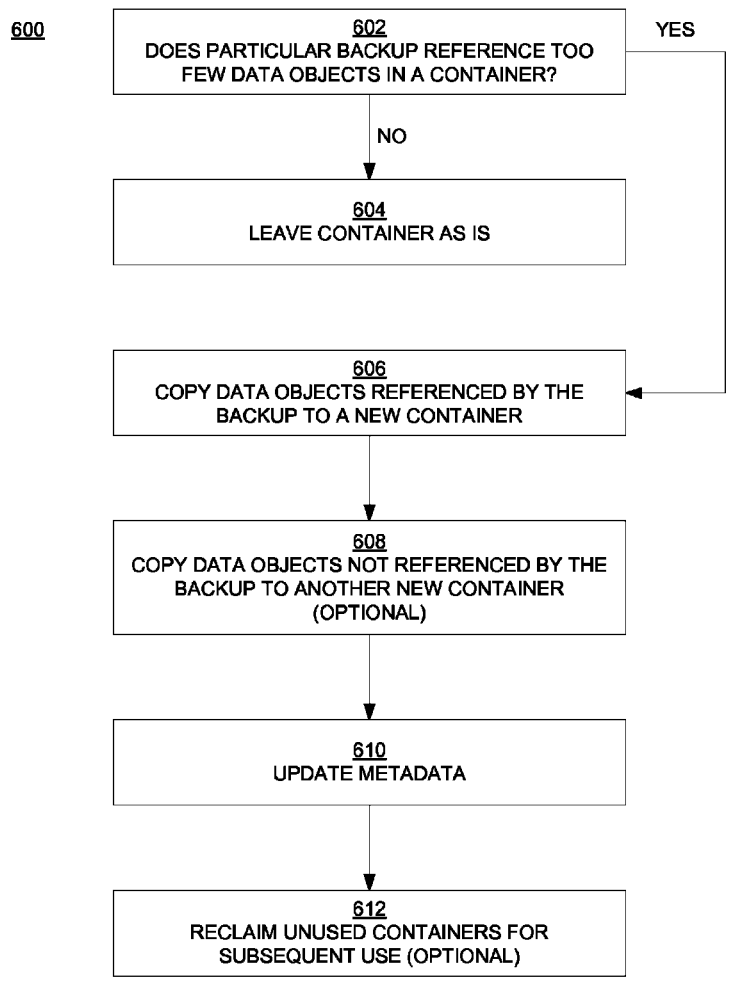
FIG. 6 is a flowchart of an example of a computer-implemented backup process according to embodiments of the present disclosure.

FIG. 6 is a flowchart 600 of an example of a computer-implemented pseudo full backup process according to embodiments of the present disclosure. The flowchart 600 can be implemented as computer-executable instructions residing on some form of non-transitory computer-readable storage medium (e.g., using computing system 110 of FIG. 1).

In block 602 of FIG. 6, a determination is made with regard to whether or not a particular backup references too few objects in a container. This determination may be made when a restore is initiated, or may be made at arbitrarily chosen times or at periodic intervals. In one embodiment, the number of data objects contained in each container associated with the particular backup is compared to a threshold value.

For example, considering the example of FIG. 5, a threshold value of 500 data objects can be specified. Accordingly, if a restore is initiated for the 200th backup, then containers 1-3557 would fail to satisfy the threshold.

In block 604 of FIG. 6, if a container satisfies the threshold, then the container is left as is.

In block 606, if a container fails to satisfy the threshold, then the data objects that are referenced by the particular backup (e.g., by the 200th backup) are copied to a new container. This operation is performed for each container that fails to satisfy the threshold.

Figure 7A:
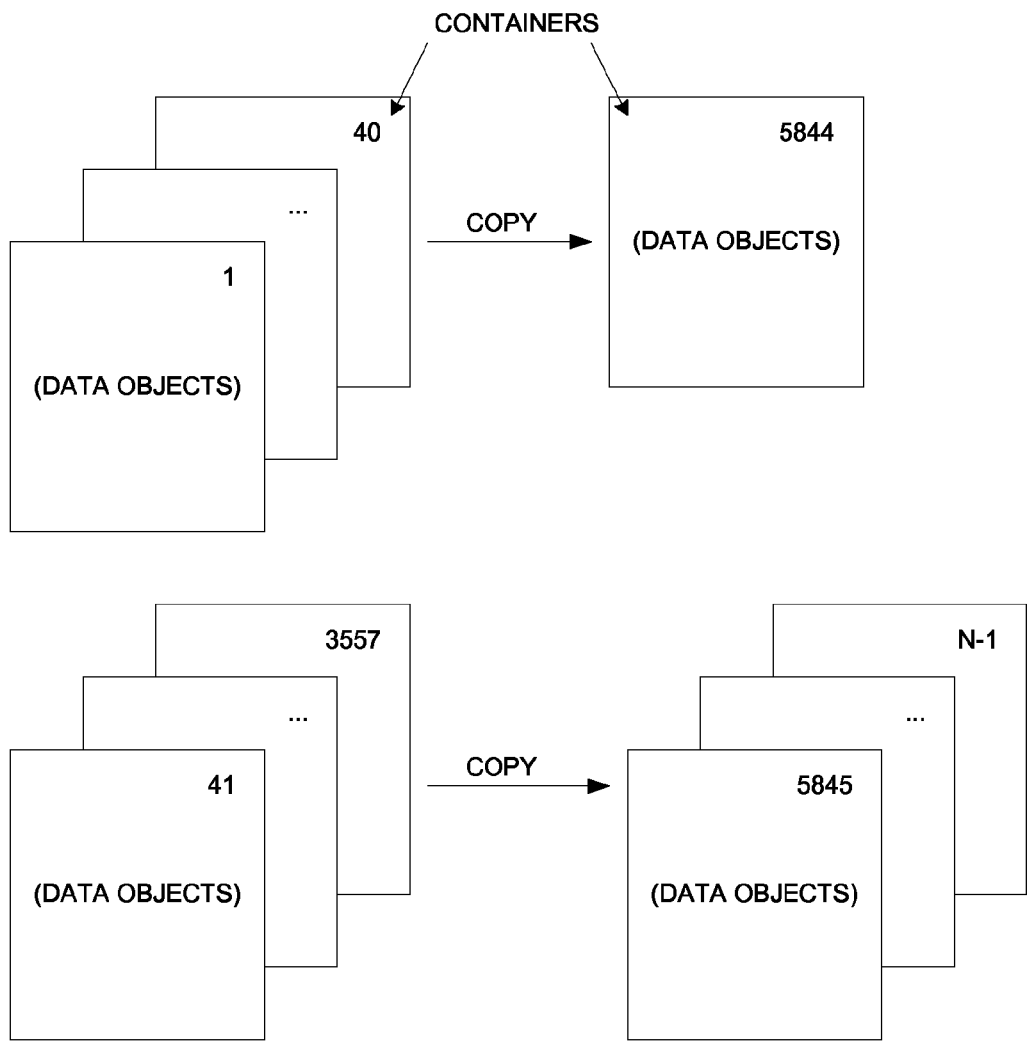
FIGS. 7A and 7B are block diagrams illustrating copying of backup data between containers according to embodiments of the present disclosure.

Again, considering the example of FIG. 5, the data objects in container 1 that are referenced by the 200th backup would be copied to a new container 5844 as shown in FIG. 7A. Data objects in container 2 that are referenced by the 200th backup would also be copied to container 5844, and so on, until container 5844 is filled.

For the purposes of this example, assume that container 5844 is filled after processing of container 40. As represented in the example of FIG. 7A, data objects in containers 1-40

(that are referenced by backup 200) are copied to container 5844, and data objects in container 41 (that are referenced by backup 200) would be copied to a new container 5845. In this example, this operation would be continued through container 3557. If, instead, only some of the selected data objects in container 40 can be copied to container 5844 before container 5844 is filled, then the contents of container 40 can be divided between containers 5844 and 5845. Alternatively, in such a situation, container 5844 may be only partially filled, and the selected data objects in container 40 are copied as a group to container 5845.

In block 608 of FIG. 6, in one embodiment, the data objects in the containers that are not referenced by the particular backup of interest are also copied to new containers in a manner similar to that just described. The operation of block 608 is optional. This operation can be performed for each container that fails to satisfy the threshold.

Figure 7B:
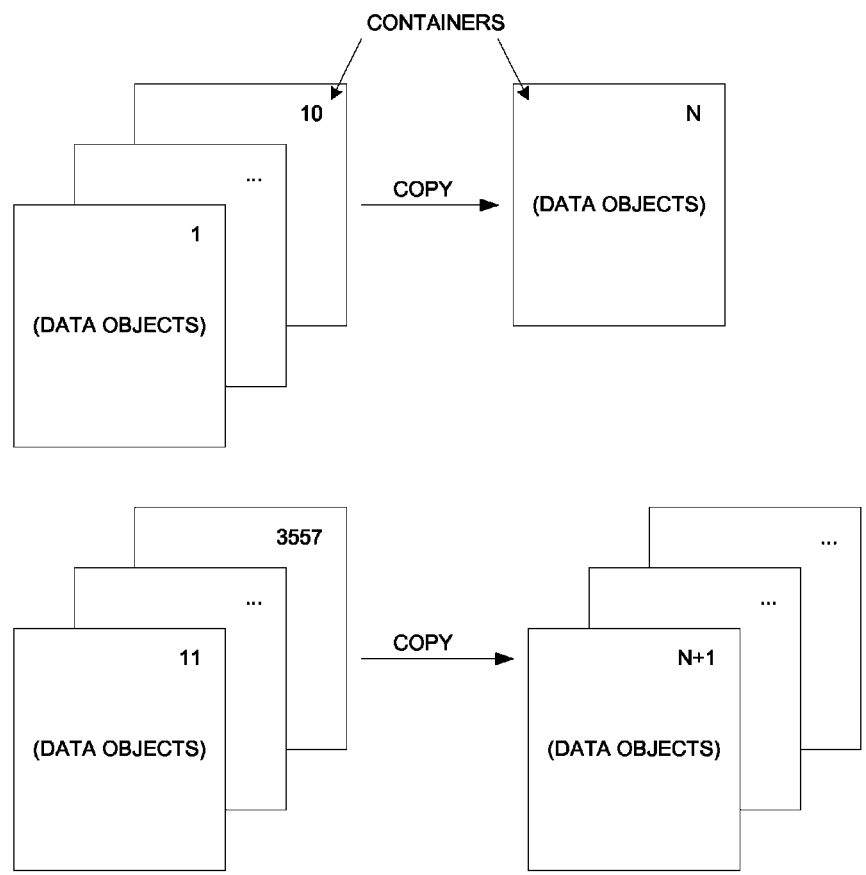

Considering the example of FIG. 5, with reference also to FIG. 7B, the data objects in container 1 that are not referenced by the 200th backup would be copied to a new container N. Data objects in container 2 that are not referenced by the 200th backup would also be copied to container N, and so on, until container N is filled. For the purposes of this example, assume that container N is filled after or during processing of container 10, in which case either the remaining data objects in container 10 (that are not referenced by backup 200) or the data objects in container 11 (that are referenced by backup 200) would be copied to a new container N+1. In this example, this operation would be continued through container 3557.

In block 610 of FIG. 6, the metadata for the particular backup of interest and the metadata for the other backups affected by the operations just described are updated. More specifically, with reference again to the example of FIG. 5, the metadata for backup 200 is updated so that it (either the backup in general or the metadata in particular) references new containers 5844, 5845, and so on as well as the previously existing containers 3558 through 5843. Also, if necessary, the metadata for backups 1 through 199 is updated so that it properly references the new containers N, N+1, and so on as well as the previously existing containers.

In block 612 of FIG. 6, the containers from which data objects were copied can be reclaimed for use in subsequent backups when no data objects in the containers are used by any of the backups. In the example of FIG. 5, containers 1-3557 can be reused by a backup after backup 200 if the optional operation of block 608 is performed or if those containers do not contain any data objects used by another backup. Thus, in one embodiment, the operation of block 612 also includes a check to determine whether or not any of the containers from which data objects were copied (e.g., containers 1-3557) include any data objects used by another backup. If not, or if the operation of block 608 is performed, then those containers can be emptied (the data objects in those containers can be deleted), or the containers may simply be overwritten.

Figure 8:
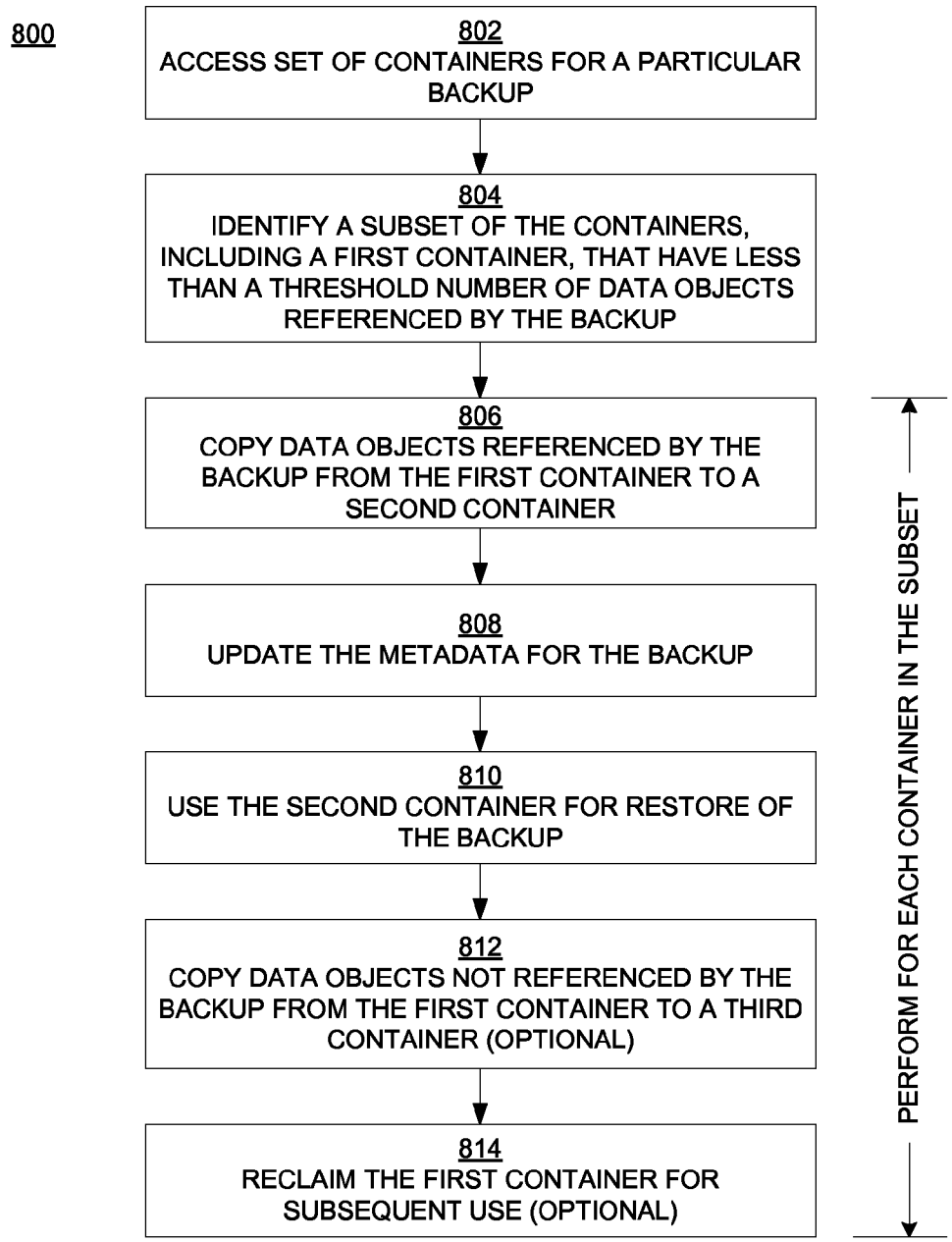
FIG. 8 is a flowchart of an example of a computer-implemented backup process according to embodiments of the present disclosure.

FIG. 8 is a flowchart 800 of an example of a computer-implemented pseudo full backup process according to embodiments of the present disclosure. The flowchart 800 can be implemented as computer-executable instructions residing on some form of non-transitory computer-readable storage medium (e.g., using computing system 110 of FIG. 1). Although described in the singular, the operations described in the flowchart 800 can be extended to the plural. That is, for example, the operations described for a single container can be applied to multiple containers at the same time, or can be repeated for each individual container.

In block 802 of FIG. 8, a set of containers, containing data objects that were written to those containers during a first backup, is accessed (here, "first backup" does not necessarily refer to the initial backup, but is simply used as an identifier). In the example of FIG. 5, the first backup corresponds to backup 200, and the set of containers includes containers 1-5843.

In block 804 of FIG. 8, subsequent to the first backup, a subset of the set of containers, including a first container, that have less than a threshold number of data objects that are referenced by metadata associated with the first backup, is identified (here, "first container" does not necessarily refer to container 1, but is simply used as an identifier). With reference to FIG. 5, if the threshold number is 500, for example, then the subset includes containers 1-3557.

In block 806 of FIG. 8, data objects that are referenced by the metadata for the first backup, are copied to another container (e.g., a second or new container). In the example of FIGS. 5 and 7A, the data objects in container 1 and referenced by backup 200 are copied to container 5844.

In block 808 of FIG. 8, the metadata for the first backup is updated to include a reference to the new (e.g., second) container.

In block 810, the second container can be used to restore data objects for the first backup.

In block 812, in one embodiment, data objects that are in the subset and that are not referenced by the metadata for the first backup, are optionally copied to a third (e.g., new) container. In the example of FIGS. 5 and 7B, the data objects in container 1 that are not referenced by backup 200 may be copied to container N.

In block 814 of FIG. 8, subsequent to the copying, the first container may be used to store data objects in response to a second backup (e.g., backup 201, following backup 200) if the operation of block 812 is performed or if the first container does not contain a data object used by another backup. That is, the first container can be reclaimed for subsequent use.

The pseudo full backup operations described in conjunction with FIGS. 6 and 8 can be triggered if the number of containers that contain fewer than the threshold number of data objects referenced by the most recent backup exceeds a second threshold. With reference to FIG. 5, if the threshold number is 500, then a pseudo full backup can be triggered if more than 3500 containers include less than 500 data objects referenced by backup 200, for example.

Alternatively, a pseudo full backup can be triggered if the time needed to perform a restore operation exceeds or is expected to exceed a time-based threshold. In any case, so that computational resources are not unnecessarily consumed, it is desirable to make sure that a pseudo full backup is not triggered prematurely. That is, the triggering threshold can be chosen so that it is low enough to trigger the pseudo full backup when deemed necessary but high enough to avoid premature reorganization of the backup data. To that end, a "doubly sorted queuing" operation can be performed.

In overview, at restore time, a backup server lists the schedule of data objects that are to be restored in a first queue and sorts the read requests by disk position, in order to enhance disk read access patterns. Read results are accumulated in a second queue, and the read results are sorted again to the original disk write order (which is sequential by definition). This double sorting of restore requests enhances both disk read accesses and restored image write accesses.

Doubly sorted queuing advantageously utilizes the original data layout at restore time, before a pseudo full backup is triggered. With doubly sorted queuing in place, the threshold for triggering a pseudo full backup can be raised because a restore can be performed more efficiently. In other words, doubly sorted queuing allows pseudo full backups to be performed less frequently while still realizing an improvement in restore performance.

Figure 9:
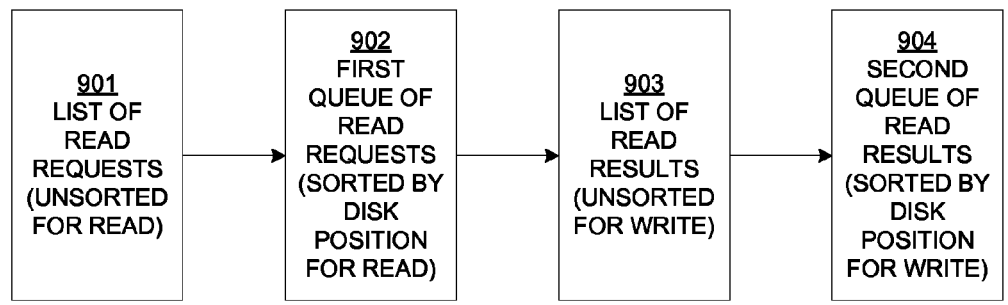
FIG. 9 illustrates a doubly sorted queuing operation according to an embodiment of the present invention.

FIG. 9 illustrates a doubly sorted queuing operation according to an embodiment of the present invention. As described above, a list 901 of data objects to be read is compiled. The list is sorted into a first queue 902 according to the positions on the memory disks from which the data objects are to be read. The objects are then read in the order specified by the first queue 902. The list of read data objects 903 is sorted into a second queue 904 according to the positions on the memory disks to which the data objects are to be written. The objects are then written in the order specified by the second queue 904.

Figure 10:
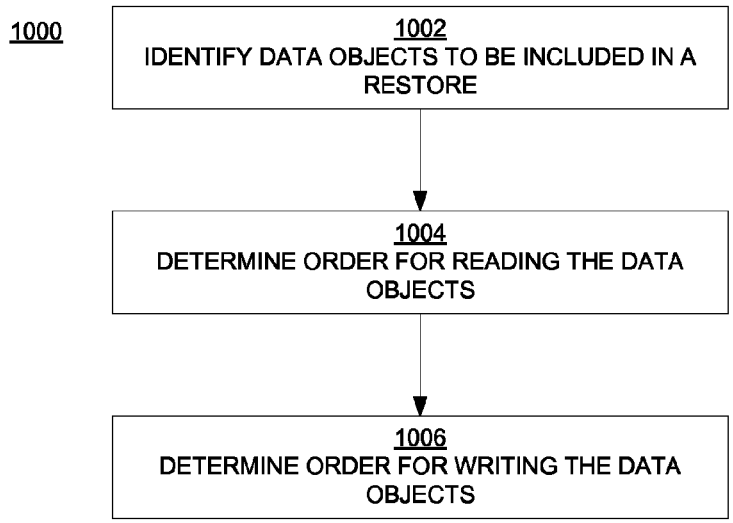
FIG. 10 is a flowchart of an example of a computer-implemented doubly sorted queuing process according to embodiments of the present disclosure.

FIG. 10 is a flowchart 1000 of an example of a computer-implemented doubly sorted queuing process according to embodiments of the present disclosure. The flowchart 1000 can be implemented as computer-executable instructions residing on some form of non-transitory computer-readable storage medium (e.g., using computing system 110 of FIG. 1).

In block 1002 of FIG. 10, the data objects to be included in a restore are identified.

In block 1004, an order for reading the data objects is determined.

In one embodiment, the read order is based on positions of the data objects on memory disks from which the data objects are to be read during the restore.

In block 1006, an order for writing the read data objects is determined. In one embodiment, the write order is based on positions on memory disks to which the data objects are to be written during the restore.

In summary, embodiments according to the present disclosure improve restore performance, especially for situations in which multiple backups are performed in combination with deduplication. According to those embodiments, a pseudo full backup is performed in lieu of a true full backup. In a pseudo full backup, data is separated at the container level into new/recently used data and old/unused data. As a result, data that might adversely affect restore performance is separated into a first set of containers, and data used in the restore is merged or condensed into a second set of containers. The amount of memory consumed by the backup data is not increased; the data is reorganized so that it can be more efficiently accessed in a restore, and unused containers can be reclaimed for subsequent use. Doubly sorted queuing is used to prevent premature execution of a pseudo full backup. Furthermore, data origin information is not used so there is no origin-related overhead.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions that, when executed, cause a computer system to perform a method of managing backup information, said method comprising:
   accessing a plurality of containers comprising data objects that were written to said plurality of containers during a first backup;
   subsequent to said first backup, identifying a subset of said plurality of containers, said subset comprising a first container having less than a threshold number of data objects that are referenced by metadata associated with a second backup;
   copying data objects that are in said first container and that are referenced by said metadata to a second container;
   modifying said metadata to reference the copies of the data objects in said second container rather than the data objects in said first container; and
   reclaiming said first container for subsequent use during one or more subsequent backups.

2. The computer-readable storage medium of claim 1 wherein said method further comprises accessing said second container to restore data objects.

3. The computer-readable storage medium of claim 1 wherein said method further comprises copying data objects that are in said subset and that are unreferenced by said metadata to a third container.

4. The computer-readable storage medium of claim 1 wherein said method further comprises performing a restore subsequent to said first backup, said restore comprising:
   identifying a plurality of said data objects to be included in said restore;
   determining an order for reading said plurality of data objects, wherein said order for reading is based on positions of said plurality of data objects on memory disks from which said plurality of data objects are to be read during said restore; and
   determining an order for writing said plurality of data objects, wherein said order for writing is based on positions on memory disks to which said plurality of data objects are to be written during said restore.

5. The computer-readable storage medium of claim 4 wherein said determining said order for reading comprises:
   compiling a list of data objects to be read; and
   sorting said list into a first queue according to said positions on said memory disks from which said plurality of data objects are to be read, said first queue comprising said order for reading;
   and wherein said determining said order for writing comprises:
   sorting said list into a second queue according to said positions on said memory disks to which said plurality of data objects are to be written, said second order comprising said order for writing.

6. The computer-readable storage medium of claim 1 wherein said second backup comprises deduplication, wherein said deduplication comprises referencing a data object created during a backup performed prior to said second backup, wherein said referencing is used in lieu of storing multiple copies of said data object.

7. The computer-readable storage medium of claim 1 wherein said first container and said second container each comprise contiguous memory space and wherein data objects are stored in said first container by said first backup only.

8. A system comprising:
   a processor;
   a communication interface coupled to said processor; and
   memory coupled to said processor and having stored therein instructions that, if executed by said system, cause said system to perform operations comprising:
   storing data objects in a plurality of containers in response to a first backup;
   subsequent to said first backup, identifying a first subset of said plurality of containers, said first subset comprising one or more containers having less than a threshold number of data objects that are referenced by metadata associated with a second backup;
   copying data objects that are in said first subset of containers and that are referenced by said metadata to a second subset of containers comprising one or more containers;
   modifying said metadata to reference the copies of the data objects in said second subset of containers rather than the data objects in said first subset of containers; and
   reclaiming said first subset of containers for use during one or more subsequent backups.

9. The system of claim 8 wherein said operations further comprise, subsequent to said copying, accessing a container in said second subset to restore data objects.

10. The system of claim 8 wherein said operations further comprise copying data objects that are in said first subset and that are unreferenced by said metadata to a third subset of containers comprising one or more containers.

11. The system of claim 8 wherein said operations further comprise performing a restore subsequent to said first backup, said restore comprising:
   identifying a plurality of said data objects to be included in said restore;
   determining an order for reading said plurality of data objects, wherein said order for reading is based on positions of said plurality of data objects on memory disks from which said plurality of data objects are to be read during said restore; and
   determining an order for writing said plurality of data objects, wherein said order for writing is based on positions on memory disks to which said plurality of data objects are to be written during said restore.

12. The system of claim 11 wherein said operations further comprise:
   compiling a list of data objects to be read; and
   sorting said list into a first queue according to said positions on said memory disks from which said plurality of data objects are to be read, said first queue comprising said order for reading;
   and wherein said determining said order for writing comprises:
   sorting said list into a second queue according to said positions on said memory disks to which said plurality of data objects are to be written, said second order comprising said order for writing.

13. A computer-implemented method of restoring data, said method comprising:
   accessing a plurality of containers comprising data objects that were written to said plurality of containers during a first backup;
   subsequent to said first backup, identifying a subset of said plurality of containers, said subset comprising a first container having less than a threshold number of data objects that are referenced by metadata associated with a second backup;
   copying data objects that are in said first container and that are referenced by said metadata to a second container;
   reclaiming said first container for use during one or more subsequent backups; and
   accessing said second container to restore data objects.

14. The method of claim 12 further comprising copying data objects that are in said subset and that are unreferenced by said metadata to a third container.

15. The method of claim 12 further comprising updating said metadata to include a reference to said second container.

16. The method of claim 12 further comprising performing a restore subsequent to said first backup, said restore comprising:
   identifying a plurality of said data objects to be included in said restore;
   determining an order for reading said plurality of data objects, wherein said order for reading is based on positions of said plurality of data objects on memory disks from which said plurality of data objects are to be read during said restore; and
   determining an order for writing said plurality of data objects, wherein said order for writing is based on positions on memory disks to which said plurality of data objects are to be written during said restore.

17. The method of claim 12 further comprising:
   compiling a list of data objects to be read; and sorting said list into a first queue according to said positions on said memory disks from which said plurality of data objects are to be read, said first queue comprising said order for reading;

and wherein said determining said order for writing comprises:

sorting said list into a second queue according to said positions on said memory disks to which said plurality of data objects are to be written, said second order comprising said order for writing.

* * * * *